R. PETRY.
DRIP COFFEE POT.
APPLICATION FILED SEPT. 14, 1911.
1,018,337.
Patented Feb. 20, 1912.
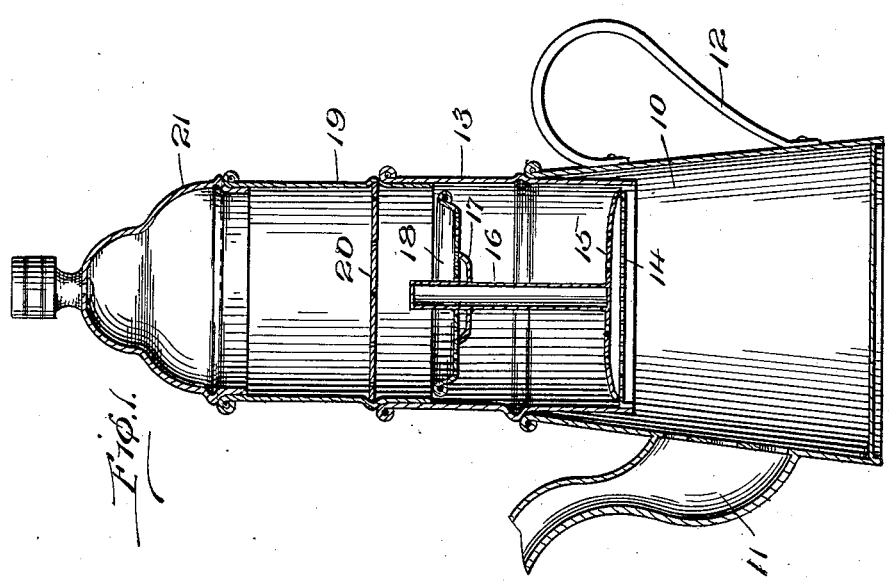
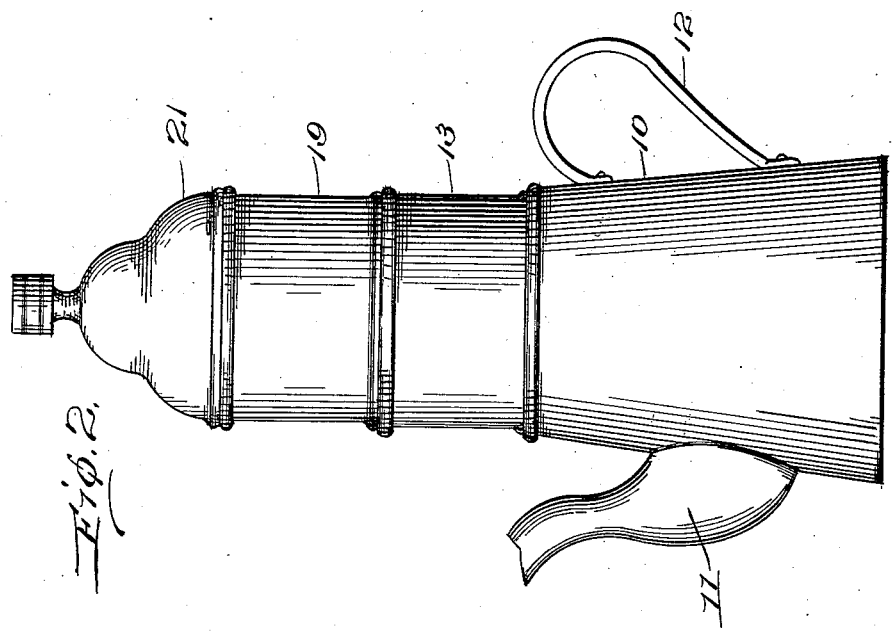
Witnesses
Inventor
Rudolph Petry,
By Mason Fenwick & Lawrence,
Attorneys

UNITED STATES PATENT OFFICE.

RUDOLPH PETRY, OF NEW ORLEANS, LOUISIANA.

DRIP-COFFEE POT.

1,018,337.   Specification of Letters Patent.   Patented Feb. 20, 1912.

Application filed September 14, 1911. Serial No. 649,292.

*To all whom it may concern:*

Be it known that I, RUDOLPH PETRY, a citizen of the United States, residing at New Orleans, in the parish of Orleans and State of Louisiana, have invented certain new and useful Improvements in Drip-Coffee Pots; and I do hereby declare the following to be a full, clear, and exact description of the invention, such as will enable others skilled in the art to which it appertains to make and use the same.

This invention relates to coffee pots and especially to that class of coffee pots known as drip coffee pots and has for an object to provide improved construction for carrying out the function of producing drip coffee.

A further object of the invention is to provide a cylinder open at the top and having a perforate bottom which is inserted into the top of substantially the usual and ordinary coffee pot, and with a second cylinder fitting into the top of the first cylinder having a foraminous bottom through which water will drip or percolate slowly.

A further object of the invention is to provide improved supporting means for the ground coffee contained within one of the cylinders.

With these and other objects in view the invention comprises certain novel constructions, combinations and arrangements of parts as will be hereinafter more fully described and claimed.

In the drawings:—Figure 1 is a vertical diametrical sectional view of the improved drip coffee pot. Fig. 2 is a view of the improved coffee pot in side elevation.

Like characters of reference indicate corresponding parts throughout the several views.

The improved drip coffee pot which forms the subject matter of this application comprises a pot proper 10 which is of any usual well known or desired construction and provided with such attachments and accessories as ordinarily employed, as for instance, a spout 11 and handle 12, although it is to be understood that the specific handle and spout as shown, or in fact any handle and spout, form no part of the present invention.

Into the open upper end of the body proper a cylinder 13 is inserted, being open at the upper end and closed at the lower end by a perforate bottom 14. Within the cylinder 13 a coffee positioning member is provided having a convex perforate base 15 and an upright or column 16 supporting a bracket 17 which is employed to position and support a perforate dished member 18 which is removable from such standard 16.

Into the upper end of the cylinder 13 a second cylinder 19 is inserted having a bottom 20 provided with minute perforations or other openings for the passage of water, and a cover 21 is provided which fits into the open upper end of such cylinder 19.

In operation, coffee in a ground condition is introduced into the cylinder 13 upon the top of the dished member 18 and the cylinder 19 filled with boiling water is inserted, as shown in the drawings. The pot is then set upon the stove or other heating element and the water from the cylinder 19 permitted to percolate through the minute openings in the bottom 20 into and through the coffee contained within the cylinder 13, which coffee passes downwardly over the edges of the dished member 18 and through the perforations thereof onto the base 19 but is prevented from passing into the pot 10 by reason of the size of the perforations in the bottom 14. Such perforations permit the passage only of the fluid which has become impregnated with the aromatic qualities and essentials of the coffee through which it is passed.

I claim:—

1. In a coffee pot, a pot body, a cylinder insertible within and to extend above the pot body and provided with a perforate bottom, a coffee supporting member positioned within the cylinder and comprising a perforate base, a column and a perforate cup member supported upon the column and spaced from the base, a cylinder insertible within the first mentioned cylinder and adapted to extend above such cylinder and to position the coffee supporting device, a perforate bottom formed in the last mentioned cylinder, and a cover for the last mentioned cylinder.

2. In a coffee pot, a pot body, a cylinder insertible within the body and having a perforate bottom, a coffee supporting device disposed within the cylinder and comprising a perforate base, a central column and a perforate cup member, and a cylinder insertible in the first mentioned cylinder and embodying a perforate bottom disposed over the coffee supporting member.

In testimony whereof I affix my signature in presence of two witnesses.

RUDOLPH PETRY.

Witnesses:
ARMSTRONG DONALDSON,
EUGENE STANLEY.

Copies of this patent may be obtained for five cents each, by addressing the "Commissioner of Patents, Washington, D. C."